United States Patent Office 2,835,668
Patented May 20, 1958

2,835,668

PYRIDYLETHYLATED BENZOXAZINEDIONES AND PROCESS FOR PREPARATION

Seymour L. Shapiro, Hastings-on-Hudson, Louis Freedman, Mount Vernon, and Ira M. Rose, Yonkers, N. Y., assignors to U. S. Vitamin Corporation, New York, N. Y., a corporation of Delaware No Drawing. Application June 22, 1956
Serial No. 593,059

8 Claims. (Cl. 260—244)

The invention relates to benzoxazinediones and to a process for making them. More particularly, it pertains to reaction products of benzoxazinediones and ring-substituted benzoxazinediones with a vinyl pyridine and includes correlated improvements and discoveries whereby the preparation of such compounds is enhanced.

An object of the invention is to provide as novel compositions of matter benzoxazinedione derivatives which have a substituent in the benzenoid ring.

A further object of the invention is the provision of derivatives of benzoxazinedione which contain 2-pyridyl-ethyl linked to the N—.

Another object of the invention is to provide pyridyl ethylated derivatives of benzoxazinediones, and especially such derivatives as have a substituent in the benzenoid ring.

A still further object of the invention is the provision of a process for the preparation of pyridyl ethylated benzoxazinediones by reacting a pyridine having a vinyl group in the 2- or 4-position of the pyridine ring with a benzoxazinedione having available the acidic hydrogen on the nitrogen in the 3-position of the benzoxazinedione system, and a special object of the invention is the provision of a process for the preparation of pyridyl ethylated benzoxazinediones by reacting a member of the group consisting of 2-vinylpyridine, 2-vinyl-5-ethylpyridine, and 4-vinylpyridine with a substituted 1,3-benzoxazinedione-2,4-dione.

A particular object of the invention is to provide a process for the preparation of substituted benzoxazinediones by reacting a member of the group consisting of a substituted aromatic o-hydroxy acid and esters thereof with ammonia, with formation of the amide, then carbonating and finally eliminating the alcohol with cyclization to the benzoxazinedione.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

In the practice of the invention, the benzoxazinediones may be prepared by reacting a pyridine having a vinyl group in the 2- or 4-position of the pyridine ring with a benzoxazinedione having available the acidic hydrogen on the nitrogen in the 3-position of the benzoxazinedione system. The reaction which takes place may be illustrated by the following equation

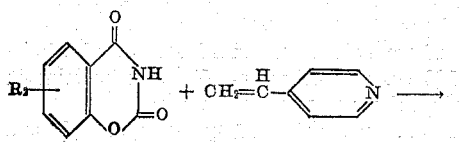

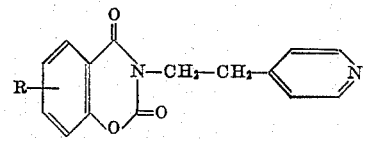

in which the $R_2$ representation is the same as below.

Because of the tendency of the vinyl pyridines to polymerize, they ordinarily contain an inhibitor to prevent polymerization during storage. The inhibitor may be removed before reaction of the vinyl pyridine with the benzoxazinedione, but this, however, is not necessary since we have found that the reaction proceeds with the inhibitor present.

The reaction conditions for effecting the condensation may be varied, thus the reactants may be mixed, generally with an excess of the vinyl pyridine and condensed in the absence of a solvent, or an inert solvent may be employed as the reaction medium. While basic catalysis such as choline, benzyltrimethylammonium hydroxide, sodamide and the like can be employed, we have found that apparently the basicity inherent in the vinyl pyridine itself is sufficient to carry the condensation with no additional catalyst. The preferred temperature range for preparation of the compounds is 150–200° C., and the reaction is usually completed in 2–3 hours. Temperatures which are lower lead to slower reaction times, and higher reaction temperatures cause decomposition and polymerization and complicate isolation of the product.

The compounds may be defined as pyridylethylated benzoxazinediones and are represented by the following general formula

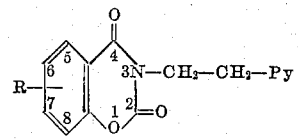

in which R is a member of the group consisting of hydrogen, alkyl having a carbon content of 1–2, aryl containing not more than 6 carbon atoms, hydroxyl, halogen, methoxyl, and Py is a member of the group consisting of 2-pyridyl, alkyl-substituted 2-pyridyl, said alkyl having a carbon content of 1–2 and 4-pyridyl, and pharmaceutically acceptable acid addition and quaternary ammonium salts thereof, which are stable and nontoxic. The conventional numbering in this ring system is indicated starting with 1 at the ring oxygen atom, and proceeding counter-clockwise through the oxazine ring and then to the benzenoid ring. In accordance with this nomenclature the oxygen in the 1-position, the nitrogen in the 3-position and the carbonyl oxygen function in the 2- and 4-positions result in the designation 1,3-benzoxazine-2,4-diones for the ring compounds herein described.

The free bases of the novel benzoxazinediones have only limited water-solubility and for many purposes it is desirable and convenient to convert the bases to water-soluble acid addition salts. The acids which can be used to prepare acid addition salts are suitably mineral acids such as hydrochloric, hydrobromic, nitric, phosphoric and sulfuric, and organic acids such as lactic, glycolic, citric, tartaric, and the like. Further, the bases can be readily converted to the acid addition salts, as for example, by direct interaction of the base with the acid in the presence of a solvent. Moreover, the acid addition salts are preferably those whose anions are relatively innocuous.

The bases can also be converted to quaternary ammonium salts derived from the lower alkyl esters of strong inorganic acids, e. g., methyl halides, methyl sulfate, methyl tosylate, ethyl halides and the like.

The following table, Table I, presents constants and characterizations of compounds illustrative of this invention. It will be understood that the description above, and the specific compounds listed in the table and in the examples which follow, are illustrative only, and that they may be varied or modified to a considerable extent without departing from the spirit of the invention or sacrificing the advantages thereof, and therefore the invention is not to be limited to the specific embodiments herein set forth.

TABLE I

*3-pyridylethylated substituted benzoxazinediones*

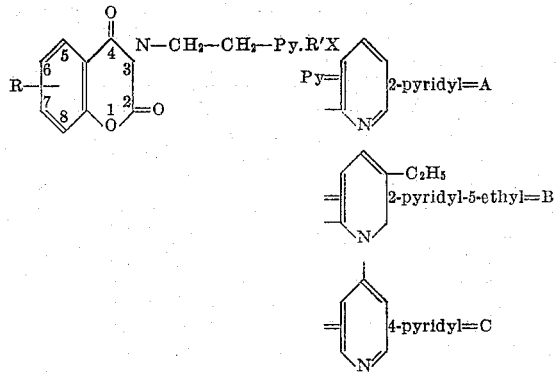

[Ph=phenyl.]

| R | Py | R'X | Formula | M. P., ° C. |
|---|---|---|---|---|
| H | A | ------- | $C_{16}H_{12}N_2O_3$ | 122 |
| H | A | $CH_3I$ | $C_{16}H_{15}N_2O_3I$ | 215-8 |
| H | B | ------- | $C_{17}H_{16}N_2O_3$ | 130-2 |
| H | B | $CH_3I$ | $C_{18}H_{19}N_2O_3I$ | 217-20 |
| H | C | ------- | $C_{15}H_{12}N_2O_3$ | 155-6 |
| H | C | $CH_3I$ | $C_{16}H_{15}N_2O_3I$ | 192-4 |
| 6-Cl | A | ------- | $C_{15}H_{11}N_2O_3Cl$ | 154-5 |
| 6-Cl | A | $CH_3I$ | $C_{16}H_{14}N_2O_3ClI$ | 212-8 |
| 6-Cl | B | ------- | $C_{17}H_{15}N_2O_3Cl$ | 154 |
| 6-Cl | C | ------- | $C_{15}H_{11}N_2O_3Cl$ | 215-6 |
| 6-Cl | C | $CH_3I$ | $C_{16}H_{14}N_2O_3ClI$ | 183-5 |
| 6-Br | A | ------- | $C_{15}H_{11}N_2O_3Br$ | 161-5 |
| 6-Br | A | $CH_3I$ | $C_{16}H_{14}N_2O_3BrI$ | 218-21 |
| 6-Br | B | ------- | $C_{17}H_{15}N_2O_3Br$ | 155-7 |
| 6-Br | B | $CH_3I$ | $C_{18}H_{18}N_2O_3BrI$ | 190-2 |
| 6-Br | C | ------- | $C_{15}H_{11}N_2O_3Br$ | 229-30 |
| 6-Br | C | $CH_3I$ | $C_{16}H_{14}N_2O_3BrI$ | 190-3 |
| 8-$CH_3$ | A | ------- | $C_{16}H_{14}N_2O_3$ | 132-5 |
| 8-$CH_3$ | A | $CH_3I$ | $C_{17}H_{17}N_2O_3I$ | 230-5 |
| 8-$CH_3$ | B | ------- | $C_{18}H_{18}N_2O_3$ | 97-8 |
| 8-$CH_3$ | B | $CH_3I$ | $C_{19}H_{21}N_2O_3I$ | 224-8 |
| 8-$CH_3$ | C | ------- | $C_{16}H_{14}N_2O_3$ | 181-3 |
| 8-$CH_3$ | C | $CH_3I$ | $C_{17}H_{17}N_2O_3I$ | 190-200 |
| 6-ph | B | ------- | $C_{23}H_{20}N_2O_3$ | 163-4 |
| 6-ph | B | $CH_3I$ | $C_{24}H_{23}N_2O_3I$ | 177.5-80.5 |
| 6-ph | C | ------- | $C_{21}H_{16}N_2O_3$ | 170-1 |
| 6-ph | C | $CH_3I$ | $C_{22}H_{19}N_2O_3I$ | 214-5 |
| 8-ph | A | ------- | $C_{21}H_{16}N_2O_3$ | 166-8 |
| 8-ph | A | $CH_3I$ | $C_{22}H_{19}N_2O_3I$ | 194-8 |
| 8-ph | B | ------- | $C_{23}H_{20}N_2O_3$ | 139-42 |
| 8-ph | B | $CH_3I$ | $C_{24}H_{23}N_2O_3I$ | 211-13 |
| 8-ph | C | ------- | $C_{21}H_{16}N_2O_3$ | 158-60 |
| 8-ph | C | $CH_3I$ | $C_{22}H_{19}N_2O_3I$ | 190-2 |
| 6-OH | A | ------- | $C_{15}H_{12}N_2O_4$ | 202-5 |
| 6-OH | A | $CH_3I$ | $C_{16}H_{15}N_2O_4I$ | 231-3 |
| 6-OH | B | ------- | $C_{17}H_{16}N_2O_4$ | 192-4 |
| 6-OH | B | $CH_3I$ | $C_{18}H_{19}N_2O_4I$ | 210-3 |
| 6-OH | C | ------- | $C_{15}H_{12}N_2O_4$ | 260 |
| 6-OH | C | $CH_3I$ | $C_{16}H_{15}N_2O_4I$ | 210-2 |
| 7-OH | A | ------- | $C_{15}H_{12}N_2O_4$ | 217-9 |
| 7-OH | A | $CH_3I$ | $C_{16}H_{15}N_2O_4I$ | 243-5 |
| 7-OH | B | ------- | $C_{17}H_{16}N_2O_4$ | 186-8 |
| 7-OH | B | $CH_3I$ | $C_{18}H_{19}N_2O_4I$ | 200-4 |
| 7-OH | C | ------- | $C_{15}H_{12}N_2O_4$ | 260 |
| 7-OH | C | $CH_3I$ | $C_{16}H_{15}N_2O_4I$ | 208-10 |

We have prepared, as starting compounds, a considerable number of new benzoxazinediones substituted in the benzenoid ring. These benzenoid substituted benzoxazinediones are prepared by a sequence of reactions involving conversion of an aromatic o-hydroxy acid, or ester, to the amide of the acid, then carbonating the hydroxyacid amide thereof, and finally eliminating the alcohol and cyclization to the benzoxazinediones. This sequence proceeds according to the following equations:

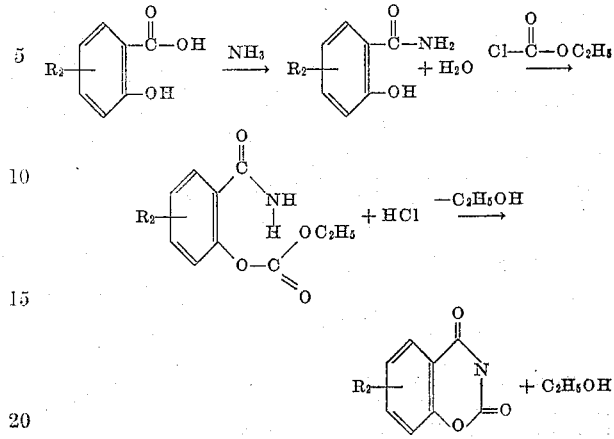

wherein $R_2$ is halogen, hydroxyl, alkyl and aryl.

Illustrative benzenoid substituted benzoxazinediones which were prepared as initial reactants for the pyridylethylated benzoxazinediones described herein are given in Table II. Details of the conditions for obtaining these reactants are set forth in the examples.

TABLE II

*Benzenoid substituted benzoxazinediones*

| $R_2$ | Formula | M.P.,°C. |
|---|---|---|
| 6-Cl | $C_8H_4NO_3Cl$ | 280 |
| 6-Br | $C_8H_4NO_3Br$ | 285-6 |
| 8-$CH_3$ | $C_9H_7NO_3$ | 210-2 |
| 6-ph | $C_{14}H_9NO_3$ | 258-9 |
| 8-ph | $C_{14}H_9NO_3$ | 232-4 |
| 6-OH | $C_8H_5NO_4$ | 303-5 |
| 7-OH | $C_8H_5NO_4$ | >310 |

EXAMPLE 1.—3-(2-[2-PYRIDYLETHYL])-1,3-BENZOXAZINE-2,4-DIONE

To 5.0 g. of 1,3-benzoxazine-2,4-dione were added 4.0 cc. of 2-vinylpyridine. The reaction mixture equipped with reflux condenser was heated in an oil bath at 190° C. for 2 hours. The initial boiling due to the presence of unreacted 2-vinylpyridine stopped after 0.5 hour. On cooling, the reaction mixture solidified and after crushing under hexane and filtering, the desired product was obtained which was recrystallized from ethyl acetate-hexane.

*Analysis.*—Calcd. for $C_{15}H_{12}N_2O_3$: C, 67.2; H, 4.5; N, 10.4. Found: C, 66.8; H, 4.5; N, 9.9.

The hydrochloride was prepared by neutralization with hydrochloric acid.

The methiodide of the above compound was prepared in acetonitrile using an excess of methyl iodide, and the quaternary ammonium compound crystallized out after standing 24 hours.

*Analysis.*—Calcd. for $C_{16}H_{15}N_2O_3I$: C, 46.9; H, 3.7; N, 6.8. Found: C, 46.8; H, 3.6; N, 7.2.

EXAMPLE 2.—6-BROMO-3-(2-[2-(5-ETHYLPYRIDYL) ETHYL])-1,3-BENZOXAZINE-2,4-DIONE

The required 6-bromo-1,3-benzoxazine-2,4-dione was prepared as follows.

To a stirred, refluxing solution of 54.8 g. of salicylamide in 1300 cc. of chloroform, 65 g. of bromine in 100 cc. of chloroform were added over a 3-hour period. The reaction mixture was allowed to stand overnight and 66 g. of the formed 5-bromosalicylamide filtered off and rinsed with chloroform. For condensation to the benzoxazinedione the 5-bromosalicylamide (43.2 g.) was dissolved in 100 cc. of hot pyridine, and then 60 cc. of acetonitrile added. The reaction mixture was cooled to 5° C. and the suspension so obtained treated with 22 cc. of ethylchlorocarbonate, maintaining the temperature between 5–10° C. by external cooling. The solution so obtained was distilled so that 120 cc. of low boiling products were collected with the internal temperature reaching 122° C. The reaction mixture was then refluxed for 1 hour and cooled. The reaction mixture was treated with water and concentrated hydrochloric acid, and 46.2 g. of the insoluble 6-bromo-1,3-benzoxazine-2-dione filtered off and recrystallized from methylcellosolve.

To 12.1 g. of this benzoxazine were added 5.5 g. of 2-vinyl-5-ethylpyridine and the reaction mixture under reflux heated in an oil bath at 190° C. until molten, and heated for additional 2 hours. The solid obtained after cooling was crushed under hexane, separated by filtration and dissolved in aqueous hydrochloric acid. The acid solution was treated with charcoal, filtered and the filtrate neutralized with 0.1 N sodium hydroxide precipitating the desired product which was filtered, dried, and recrystallized from ethylacetate.

Analysis.—Calcd. for $C_{17}H_{15}N_2O_3Br$: C, 54.4; H, 4.0. Found: C, 54.5; H, 3.8.

The methiodide was prepared by treating an acetonitrile solution of the above compound with excess of methyl iodide, refluxing for 1 hour and allowing to stand 20 hours at 5° C. The quaternary ammonium compound separated as crystals.

Analysis.—Calcd. for $C_{18}H_{18}N_2O_3BrI$: C, 41.8; H, 3.5; N, 5.4. Found: C, 42.1; H, 3.8; N, 5.3.

EXAMPLE 3.—6-CHLORO-3-(2-[4-PYRIDYLETHYL])-1,3-BENZOXAZINE-2,4-DIONE

The required 6-chloro-1,3-benzoxazine-2,4-dione was prepared as follows.

5-chloro-salicylic acid was converted to its methyl ester by refluxing in methanol containing catalytic quantities of sulfuric acid. Methyl-5-chlorosalicylate was converted to the methyl-5-chloro-salicylamide by treatment with excess ammonium hydroxide containing aluminum turnings (M. Hauptschein et al., J. Am. Chem. Soc. 76, 4476, 1954). The amide so obtained was converted by treatment with ethyl chlorocarbonate to the 6-chloro-1,3-benzoxazine-2,4-dione in pyridine-acetonitrile in a manner analogous to that described in Example 2.

To 6.59 g. of 6-chloro-1,3-benzoxazine-2,4-dione were added 25 cc. of 4-vinylpyridine and the reaction mixture heated under reflux in an oil bath until molten, and then for 2 additional hours at 150° C. On cooling, the product crystallized; the excess vinylpyridine was decanted; the crystalline mat of product ground under hexane, and separated. The product so obtained was recrystallized from methylcellosolve.

Analysis.—Calcd. for $C_{15}H_{11}N_2O_3Cl$: C, 59.5; H, 3.7; N, 9.3. Found: C, 59.7; H, 3.8; N, 9.3.

The methiodide of this free base was prepared as above described in Example 2.

Analysis.—Calcd. for $C_{16}H_{14}N_2O_3ClI$: C, 43.2; H, 3.2; N, 6.3. Found: C, 43.2; H, 3.2; N, 5.9.

EXAMPLE 4.—8-METHYL-3-(2-[2-PYRIDYLETHYL])-1,3-BENZOXAZINE-2,4-DIONE

The required 8-methyl-1,3-benzoxazine-2,4-dione was prepared as follows.

3-methylsalicylic acid was converted to its methyl ester by methanolysis in the presence of sulfuric acid. The ester was in turn converted to the amide, following the procedure of Example 3. The amide was converted with ethyl chlorocarbonate to the required reactant, following the procedure of Example 2.

To 8.86 g. of 8-methyl-1,3-benzoxazine-2,4-dione were added 25 cc. of 2-vinylpyridine and the reaction mixture heated under reflux in an oil bath until molten, and then for an additional 2 hours at 150° C. The molten mass was transferred to a flask and 25 cc. of hexane added. On cooling, the product crystallized. The supernatant was decanted; the crystalline mat triturated with hexane; separated; recrystallized from ethylacetate-hexane, and again recrystallized from ethylacetate.

Analysis.—Calcd. for $C_{16}H_{14}N_2O_3$: C, 68.1; H, 5.0; N, 9.9. Found: C, 68.3; H, 5.0; N, 9.6.

The methiodide of this free base was prepared as above described in Example 2.

Analysis.—Calcd. for $C_{17}H_{17}N_2O_3I$: C, 48.1; H, 4.0; N, 6.6. Found: C, 48.0; H, 3.7; N, 6.8.

EXAMPLE 5.—6-PHENYL-3-(2-[2-(5-ETHYLPYRIDYL)ETHYL])-1,3-BENZOXAZINE-2,4-DIONE

The required 6-phenyl-1,3-benzoxazine-2,4-dione was prepared as follows.

5-phenyl-salicylic acid was converted to its methyl ester, and this in turn to the amide, which was then converted upon treatment with ethyl chlorocarbonate in pyridine-acetonitrile to the 6-phenyl-1,3-benzoxazine-2-4-dione by the procedure described above in Example 2.

To 5.3 g. of this benzoxazine were added 20 cc. of 2-vinyl-5-ethylpyridine and the reaction mixture under reflux heated in an oil bath at 150° C. until molten, and then heated for an additional 2 hours at this temperature. On cooling, the product crystallized, and was separated and triturated with 30% ethyl acetate in hexane. The product was filtered, and recrystallized from ethyl acetate.

Analysis.—Calcd. for $C_{23}H_{20}N_2O_3$: C, 74.2; H, 5.4; N, 7.5. Found: C, 74.4; H, 5.6; N, 7.7.

The methiodide was prepared as above described in Example 2.

Analysis.—Calcd. for $C_{24}H_{23}N_2O_3I$: C, 56.0; H, 4.5; N, 5.5. Found: C, 56.3; H, 4.3; N, 5.3.

EXAMPLE 6.—8-PHENYL-3-(2-[4-PYRIDYL]ETHYL)-1,3-BENZOXAZINE-2,4-DIONE

The required 8-phenyl-1,3-benzoxazine-2,4-dione was prepared as follows:

3-phenyl-salicylic acid was converted to its methyl ester and this in turn to the amide, which was then converted upon treatment with ethyl chlorocarbonate in pyridine-acetonitrile to 8-phenyl-1,3-benzoxazine-2,4-dione by the procedure described in Example 2.

To 5.0 g. of this benzoxazine were added 20 cc. of 4-vinylpyridine and the reaction mixture under reflux was heated in an oil bath at 150° C. until molten, and then heated for an additional 3 hours at 150–160° C. On cooling, the product crystallized; was filtered off, and rinsed with hexane and then with a mixture of 9 parts hexane-6 parts ethanol. The solid remaining was ground with hexane; separated, and recrystallized from butanol.

Analysis.—Calcd. for $C_{21}H_{16}N_2O_3$: C, 73.2; H, 4.7; N, 8.1. Found: C, 72.7; H, 4.1; N, 8.3.

The methiodide was prepared as above using ethyl acetate as a reaction solvent.

Analysis.—Calcd. for $C_{22}H_{19}N_2O_3I$: C, 54.3; H, 3.9; N, 5.8. Found: C, 54.4; H, 3.8; N, 6.0.

EXAMPLE 7.—6-HYDROXY-3-(2-[2-PYRIDYL]ETHYL)-1,3-BENZOXAZINE-2,4-DIONE

The required 6-hydroxy-1,3-benzoxazine-2,4-dione was prepared as follows.

5-hydroxy-salicylic acid (gentisic acid) was converted to methylgentisate and this in turn to the amide which was then converted upon treatment with ethylchlorocarbonate in pyridine-acetonitrile to 6-hydroxy-1,3-benzoxazine-2,4-dione, M. P. 303–5° C. by the procedure described above in Example 2.

To 7.0 g. of this benzoxazine were added 35 cc. of 2-vinylpyridine and the reaction mixture under reflux was heated in an oil bath at 150° C. until molten, and then for 2 additional hours at 150° C. After cooling and standing overnight, the semi-crystalline mass was treated with 65 cc. of ethyl acetate, and the insoluble product separated by filtration and recrystallized from butanol.

Analysis.—Calcd. for $C_{15}H_{12}N_2O_4$: C, 63.4; H, 4.3; N, 9.9. Found: C, 63.6; H, 4.1; N, 9.7.

The methiodide was prepared as above using dimethylformamide as a solvent.

Analysis.—Calcd. for $C_{16}H_{15}N_2O_4I$: C, 45.1; H, 3.6; N, 6.6. Found: C, 44.8; H, 3.6; N, 6.7.

EXAMPLE 8.—7-HYDROXY-3-(2-[2-(5-ETHYLPYRIDYL) ETHYL])-1,3-BENZOXAZINE-2,4-DIONE 2,4-dihydroxybenzoic acid (β-resorcylic acid) was converted to methyl-β-resorcylate and this in turn to the amide which was then converted to 7-hydroxy-1,3-benzoxazine-2,4-dione, M. P.>310° C., upon treatment with ethyl chlorocarbonate in pyridine-acetonitrile as described in Example 2.

To 7.0 g. of this benzoxazine were added 25 cc. of 2-vinyl-ethylpyridine and the reaction mixture under reflux was heated in an oil bath at 150° C. until molten, and then heating continued another 2 hours at this temperature. On cooling, the product crystallized, and the reaction mixture was diluted with ethyl acetate; the product separated by filtration, and recrystallized from butanol.

Analysis.—Calcd. for $C_{17}H_{16}N_2O_4$: C, 65.4; H, 5.2; N, 9.0. Found: C, 65.2; H, 4.8; N, 8.8.

The methiodide was prepared in a manner similar to Example 7.

Analysis.—Calcd. for $C_{18}H_{19}N_2O_4I$: C, 47.6; H, 4.2; N, 6.2. Found: C, 47.8; H, 3.8; N, 6.4.

The compounds of this invention are useful as synthetic intermediates for the preparation of various compounds and can, by their addition reaction and differential hydrolysis, afford a broad spectrum of new and interesting chemicals, such as the pyridylethylamides of salicylic, and substituted salicylic acids. The compounds are also useful as therapeutic agents and have been found to have anticonvulsant, antiinflammatory, analgesic, hypnotic, ganglionic blocking and allied pharmacological types of activity.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. As a composition of matter a member of the group consisting of a pyridylethylated benzoxazinedione having the formula

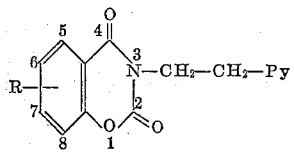

wherein Py is a member of the group consisting of 2-pyridyl, alkyl-substituted-2-pyridyl, said alkyl having a carbon content of 1-2, and 4-pyridyl, and R is a member of the group consisting of hydrogen, halogen, hydroxyl, alkyl having a carbon content of 1-2, methoxyl and aryl containing not more than 6 carbon atoms, and pharmaceutically acceptable acid addition and quaternary ammonium salts thereof.

2. A composition of matter as defined in claim 1, the free base wherein R is hydrogen, and Py is 2-pyridyl.

3. A composition of matter as defined in claim 1, the free base wherein R is hydrogen and Py is 2-pyridyl-5-ethyl.

4. A composition of matter as defined in claim 1, the free base wherein R is 8-methyl and Py is 4-pyridyl.

5. A composition of matter as defined in claim 1, the free base wherein R is 7-hydroxy and Py is 4-pyridyl.

6. A composition of matter as defined in claim 1, the free base wherein R is 6-chloro and Py is 2-pyridyl.

7. A process for the preparation of 3-pyridylethylated-1,3-benzoxazine-2,4-diones which comprises reacting a member of the group consisting of 2-vinylpyridine, 2-vinyl-5-ethylpyridine and 4-vinylpyridine and a 1,3-benzoxazine-2,4-dione having the formula

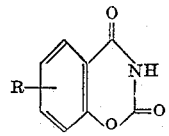

wherein R is a member of the group consisting of hydrogen, halogen, hydroxyl, alkyl having a carbon content of 1-2, methoxyl and aryl containing not more than 6 carbon atoms, and recovering the resultant 3-pyridylethylated-1,3-benzoxazine-2,4-dione.

8. A process for the preparation of 3-pyridylethylated-1,3-benzoxazine-2,4-diones which comprises reacting a member of the group consisting of 2-vinylpyridine, 2-vinyl-5-ethylpyridine and 4-vinylpyridine and a 1,3-benzoxazine-2,4-dione having the formula

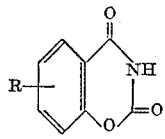

wherein R is a member of the group consisting of hydrogen, halogen, hydroxyl, alkyl having a carbon content of 1-2, methoxyl and aryl containing not more than 6 carbon atoms, at a temperature from about 150° C. to about 200° C. and recovering the resultant 3-pyridylethylated-1,3-benzoxazine-2,4-dione.

References Cited in the file of this patent

UNITED STATES PATENTS

| | | |
|---|---|---|
| 2,476,559 | Nawiasky et al. | July 19, 1949 |
| 2,714,105 | Wright | July 26, 1955 |

OTHER REFERENCES

Mameli: Chem. Abstracts, vol. 17, p. 1643 (1923).
Comanducci: Chem. Abstracts, vol. 18, p. 1658 (1924).
Mameli: Chem. Abstracts, vol. 18, p. 3063 (1924).
Mameli: Chem. Abstracts, vol. 21, p. 1269 (1927).